F. J. A. McCAULEY.
CONVERTIBLE VEHICLE BODY.
APPLICATION FILED JAN. 12, 1917.
1,249,793.
Patented Dec. 11, 1917.
2 SHEETS—SHEET 1.
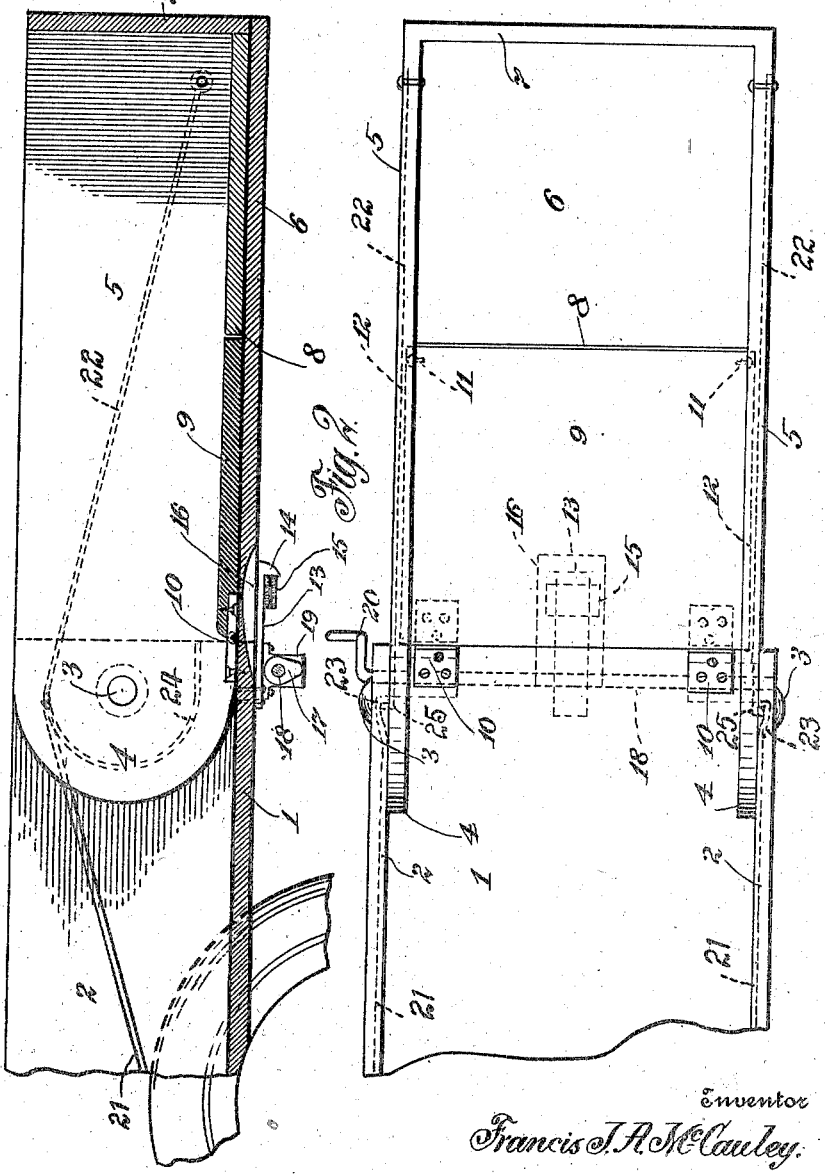

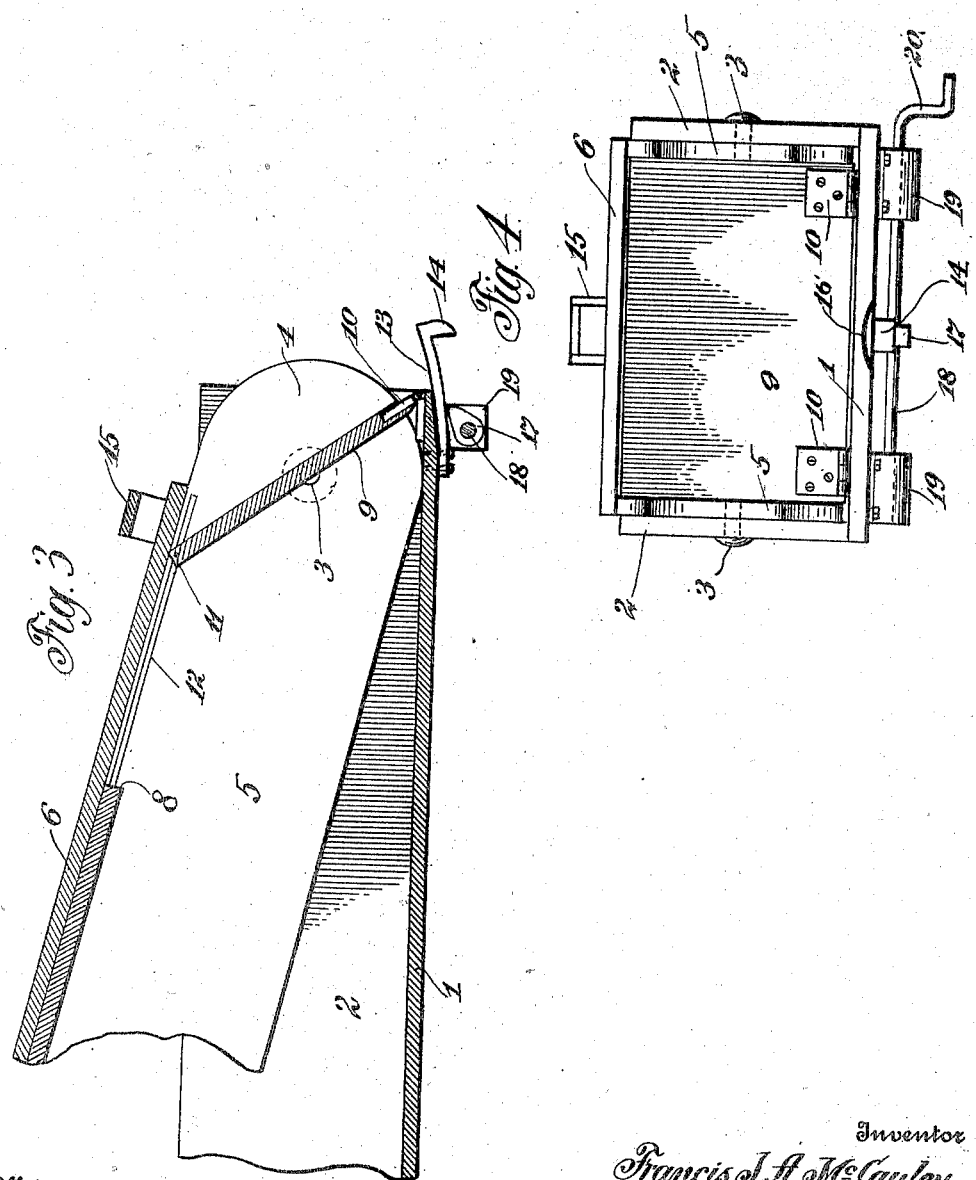

UNITED STATES PATENT OFFICE.

FRANCIS J. A. McCAULEY, OF DETROIT, MICHIGAN.

CONVERTIBLE VEHICLE-BODY.

1,249,793.     Specification of Letters Patent.     Patented Dec. 11, 1917.

Application filed January 12, 1917. Serial No. 141,928.

*To all whom it may concern:*

Be it known that I, FRANCIS J. A. MC-CAULEY, a citizen of the United States of America, residing at Detroit, in the county of Wayne and State of Michigan, have invented certain new and useful Improvements in Convertible Vehicle-Bodies, of which the following is a specification, reference being had therein to the accompanying drawings.

This invention relates to a convertible automobile body, and the primary object of my invention is to provide an automobile body or bed that may be increased in its longitudinal dimension by a foldable body extension that will increase the carrying capacity of the automobile body and serve functionally as a cover or inclosure for the automobile body proper thus permitting merchandise or matter within the automobile body being protected from the forces of nature and at the same time precluding any possibility of the merchandise or matter being surreptitiously removed or lost.

Another object of my invention is to furnish an automobile body with an extensible portion and a closure member, the latter being automatically actuated to serve as a tail gate or closure for the automobile body when the extension thereof is closed, and when the extension is open or in an active position, increasing the carrying capacity of the automobile body, with the closure member or tail gate forming part of the bed or floor of the extension.

A further object of my invention is to provide a vehicle body extension that is simple in construction, inexpensive to manufacture, applicable to various vehicle bodies, and highly efficient for the purposes for which it is intended.

With the above and other objects in view, my invention resides in the novel construction, combination and arrangement of parts to be hereinafter specifically described and then claimed.

Reference will now be had to the drawings, wherein—

Figure 1 is a longitudinal sectional view of a portion of an automobile body showing the extension thereof in an active position;

Fig. 2 is a plan of the same;

Fig. 3 is a longitudinal sectional view of a portion of the automobile body, showing the extension folded or closed, and Fig. 4 is an end view of the same.

In the drawing, there is shown a portion of a vehicle body having a bed 1 and side walls 2, such a vehicle body being common in connection with horse drawn and automobile express and delivery bodies.

Pivotally connected to the inner sides of the walls 2, at the open end of the body, by pins 3 or other pivotal means are the ears or ends 4 of side walls 5 coöperating with a bed 6 and an end wall 7 in forming an extension for the vehicle body. The bed 6 has the inner side thereof provided with a recess 8 for a closure member or tail gate 9. The closure member 9 is hinged, as at 10, to the end of the bed 1 and the side edges of the closure member, at the free end thereof, are provided with studs 11 extending into longitudinal grooves 12 provided therefor in the inner sides of the extension walls 5, said grooves being within the recess 8 so as to guide the closure member 9 into the recess 8 when the extension is swung to an active position, as shown in Figs. 1 and 2.

By swinging the extension upwardly and over the vehicle body, the studs 11 moving in the grooves 12 gradually swing the closure member 9 upwardly and to an inclined position, as shown in Fig. 3, said closure member coöperating with the bed 1, the side walls 5 and the bed 6 in closing the rear end of the vehicle body. With the extension in this position, the contents of the vehicle body are inclosed and protected.

A suitable catch or hold-fast means may be employed for retaining the extension in the active position shown in Figs. 1 and 2, and as an example of such hold-fast means, there is shown a resilient catch 13 having a bill 14 adapted to engage a keeper 15 carried by the bed 6 of the extension. The bed 6 of the extension and the bed 1 of the vehicle body are cut away, as at 16, to permit of the catch being sprung out of engagement with the keeper 15, and for this purpose a cam 17 may be employed. The cam 17 is mounted on a shaft 18 journaled in bearings 19 carried by the bed 1 and at one end of the shaft is a crank or handle 20 which permits of the shaft being rotated in a counterclockwise direction to place the cam 17 in engagement with the resilient catch and elevate the same. These elements may be reversed, that is, the resilient catch may be carried by the bed 6 of the extension and the catch actuating means arranged below the bed 6 to move the catch out of engagement with the keeper, which may be carried by the bed 1 of the vehicle body.

From the foregoing it will be noted that the body extension permits of merchandise being carried that otherwise could not be conveniently placed in the short vehicle body, and when the extension is used in connection with a truck body, suitable side braces may be employed in connection with catches of a more durable type than that shown for rigidly holding the extension in an open position relative to the vehicle body.

As an instance of side braces, there are shown in Figs. 1 and 2, sets of side rods 21 and 22. The side rods 21 are embedded in the inner sides of the walls 2 of the vehicle body and have hook ends 23, at the upper ends of curved grooves 24 in the ends of the walls 2. The side rods 22 are embedded in the outer sides of the extension body walls 5 and have hook ends 25 adapted to be freely moved in the grooves 24, when the extension body is closed, and engage the hook ends 23 of the side rods 21 when the extension body is open relative to the vehicle body. In this manner the rods 21 and 22 serve as braces for the extension body when open or extended.

While in the drawings there is illustrated a preferred embodiment of my invention, it is to be understood that the structural elements are susceptible to such variations and modifications as fall within the scope of the appended claims.

What I claim:—

1. The combination with a vehicle body having side walls, of an extension body having side walls pivotally connected to the side walls of said vehicle body and adapted to be swung upwardly and over said vehicle body, and a closure member connected to the end of said vehicle body and having the side edges thereof slidably connected to the side walls of said extension body to close the hinged end of said body when said extension body is swung over said vehicle body.

2. The combination with a vehicle body having side walls, of an extension body having side walls pivotally connected to the side walls of said vehicle body and adapted to be swung upwardly and over said vehicle body, side braces carried by said vehicle body, and side braces carried by said extension body and freely movable in the side walls of said vehicle body and adapted to engage the side braces thereof when said extension body is open relative to said vehicle body.

3. The combination with a vehicle body, of an extension body connected thereto and adapted to be swung upwardly and over said vehicle body, a closure member connected to the end of said vehicle body and having a sliding engagement with said extension body to close the end of said vehicle body when said extension body is swung over said vehicle body and side braces carried by both of said bodies, and adapted for engagement with each other when said extension body is opened relative to said vehicle body.

In testimony whereof I affix my signature in the presence of two witnesses.

FRANCIS J. A. McCAULEY.

Witnesses:
C. J. LYNCH,
OTTO F. BARTHEL.

Copies of this patent may be obtained for five cents each, by addressing the "Commissioner of Patents, Washington, D. C."